United States Patent Office 3,118,883
Patented Jan. 21, 1964

3,118,883
NEW α:β-DI-[BENZOXAZOLYL-(2)]-ETHYLENES
Max Duennenberger, Birsfelden, and Adolf Emil Siegrist, Basel, Switzerland, assignors to Ciba Limited, Basel, Switzerland
No Drawing. Filed Feb. 28, 1961, Ser. No. 92,124
Claims priority, application Switzerland Mar. 11, 1960
1 Claim. (Cl. 260—240)

The present invention provides new α:β-di-[benzoxazolyl-(2)]-ethylenes, namely the new α:β-di-[5:6-dimethyl-benzoxazolyl-(2)]-ethylene of the formula (1) 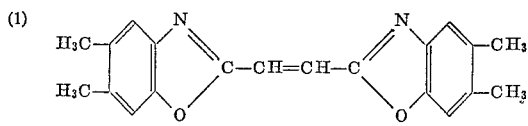

and the new α:β-di-[benzoxazolyl-(2)]-ethylenes of the formula (2) 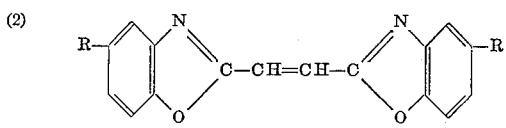

wherein R stands for phenyl or cyclohexyl.

The new compounds can be prepared by processes known for the manufacture of other α:β-di-[benzoxazolyl-(2)]-ethylenes, for example by the process described below.

1-hydroxy-2-amino-4:5-dimethylbenzene, 3 - amino - 4-hydroxy-1:1'-diphenyl or 1-hydroxy-2-amino-4 - cyclohexylbenzene is condensed at an elevated temperature in the molecular proportion of 2:1-with fumaric acid, aspartic acid, or preferably malic acid or with a functional derivative, for example a dialkyl ester, of said acids and then, without isolating the intermediate products, cyclization to form the dibenzoxazolyl compound is carried out with the aid of a catalyst and, when malic or aspartic acid is used as starting material, water or ammonia respectively is eliminated from the residues of these acids. Boric acid is a particularly suitable catalyst, and it is of advantage to carry out the reaction in an organic solvent such as xylene.

The new α:β-di-[benzoxazolyl-(2)]-ethylenes of the Formulae 1 and 2 are valuable, very efficient optical brighteners which are suitable for brightening a wide variety of materials, more especially organic materials.

Good results are obtained, for example, in brightening lacquers, such as alkyd resin lacquers or nitrocellulose ester lacquers. The compounds are also suitable for brightening films. Furthermore, they are suitable for brightening synthetic fibers, for example of cellulose esters such as acetate rayon, polyacrylonitrile, polyamide or polyvinyl chloride. They are particularly valuable for brightening polyester fibers, more especially those of terephthalic acid polyglycol esters; it is of advantage to apply the new compounds to these fibers in the form of a fine aqueous dispersion. Such dispersions can be made in known manner with the use of known dispersants, for example polyglycol ethers of higher alcohols or orthoalkyl phenols, in a high concentration, and for use the dispersion can be diluted with water in any desired proportion. The new brighteners produce a brightening effect which is very fast to light more especially on polyester fibers.

From the known α:β-di-[5-methyl-benzoxazolyl-(2)]-ethylene, the new compounds of the Formulae 1 and 2 are distinguished by the fact that they have a distinctly enhanced effect when used as optical brighteners for polyester fibers.

Unless otherwise indicated, parts and percentages in the following examples are by weight.

Example 1

A mixture of 13.7 parts of 1-hydroxy-2-amino-4:5-dimethylbenzene, 6.7 parts of malic acid, 0.3 part of boric acid and 300 parts of xylene is stirred for 6 hours at the boil under nitrogen, while continuously collecting the water formed in a water separator. On allowing the mixture to cool, α:β-di-[5:6-dimethylbenzoxazolyl-(2)]-ethylene of the Formula 1 separates in the form of yellow crystals.

Yield: about 14 parts.

After having been recrystallized three times from dimethylformamide, the product melts at 318 to 318.6° C. and reveals the following analytical data:

$C_{20}H_{18}O_2N_2$. Calculated: C, 75.45%; H, 5.70%; N, 8.80%. Found: C, 75.81%; H, 5.96%; N, 9.07%.

Example 2

A mixture of 18.5 parts of 3-amino-4-hydroxy-1:1'-diphenyl, 6.7 parts of malic acid, 0.3 part of boric acid and 300 parts of xylene is stirred for 6 hours at the boil under nitrogen and the water formed is continuously collected in a water separator. On cooling, α:β-di-[5-phenylbenzoxazolyl-(2)]-ethylene of the formula

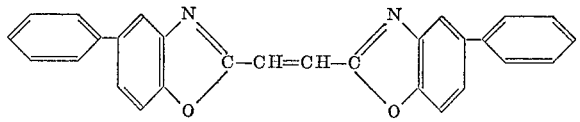

separates in the form of yellow crystals.

Yield: about 19 parts.

After having been recrystallized three times from dimethylformamide, the product melts at 256.8 to 257.4° C. and reveals the following analytical data:

$C_{28}H_{18}O_2N_2$. Calculated: C, 81.14%; H, 4.38%; N, 6.76%. Found: C, 80.71%; H, 4.28%; N, 6.71%.

Example 3

When, in Example 2, 1-hydroxy-2-amino-4:5-dimethylbenzene is replaced by 19.1 parts of 1-hydroxy-2-amino-4-cyclohexylbenzene, there is obtained α:β-di-[5-cyclohexyl-benzoxazolyl-(2)]-ethylene of the formula

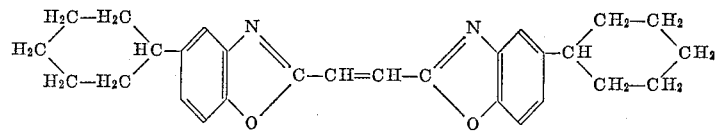

in equal purity and in a substantially identical yield.

The product melts at 205.4 to 206° C. and reveals the following analytical data:

$C_{28}H_{28}O_2N_2$. Calculated: C, 79.21%; H, 6.65%; N, 6.60%. Found: C, 79.45%; H, 6.86%; N, 6.48%.

Example 4

A finely dispersed paste is prepared from 12 parts of the compound obtained as described in Examples 1, 2 or 3 with 12 parts of an adduct from about 30 molecular proportions of ethylene oxide and a mixture of saturated fatty alcohols containing preponderantly 18 carbon atoms, and 76 parts of water.

Polyester fibers, for example "Dacron," are treated at a goods-to-liquor ratio of 1:30 with 0.2% of one of these pastes for 30 minutes at 60 to 100° C. in a bath containing per liter 1 cc. of ammonia, then rinsed and dried. The material so treated has a brighter aspect than it had before the treatment.

What is claimed is:

α:β-Di-[5-cyclohexylbenzoxazolyl-(2)]-ethylene of the formula

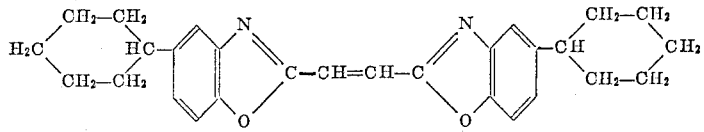

References Cited in the file of this patent

UNITED STATES PATENTS

| | | |
|---|---|---|
| 2,072,908 | Schneider | Mar. 9, 1937 |
| 2,809,123 | Keller et al. | Oct. 8, 1957 |
| 2,977,319 | Ackermann et al. | Mar. 28, 1961 |
| 2,986,528 | Siegrist et al. | May 30, 1961 |

FOREIGN PATENTS

| | | |
|---|---|---|
| 211,168 | Australia | Oct. 24, 1957 |
| 212,444 | Australia | Jan. 17, 1958 |
| 718,119 | Great Britain | Nov. 10, 1954 |
| 835,892 | Great Britain | May 25, 1960 |

OTHER REFERENCES

Beilsteins Handbuch der Organischen Chemie, 4th ed., vol. 27, page 216 (system #4195), Julius Springer, Berlin (1938).